United States Patent
Komiya et al.

(10) Patent No.: US 6,536,089 B1
(45) Date of Patent: *Mar. 25, 2003

(54) METHOD FOR PRODUCING AN INSULATED VESSEL

(75) Inventors: Yasuhiko Komiya, Tokyo (JP); Masashi Yamada, Tokyo (JP); Atsuhiko Tanaka, Tokyo (JP); Seiichi Ito, Tokyo (JP)

(73) Assignee: Nippon Sanso Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/684,306

(22) Filed: Oct. 6, 2000

Related U.S. Application Data

(63) Continuation of application No. 08/890,701, filed on Jul. 11, 1997, now Pat. No. 6,179,155, which is a continuation of application No. 08/383,759, filed on Feb. 2, 1995, now abandoned.

(30) Foreign Application Priority Data

Feb. 3, 1994 (JP) .............................................. 6-011977

(51) Int. Cl.[7] .............................................. B65D 25/18
(52) U.S. Cl. ................... 29/455.1; 29/458; 220/392.11; 220/592.21; 220/560.13; 264/328.8
(58) Field of Search ................................. 220/424, 426, 220/423, 592.21, 592.28, 592.11, 560.13, 592.2; 29/455.1, 458, 527.1, 527.2; 264/328.8, 250

(56) References Cited

U.S. PATENT DOCUMENTS

| | | | | |
|---|---|---|---|---|
| 2,547,607 A | * | 4/1951 | Sulfrian ................. | 220/560.13 |
| 3,048,294 A | * | 8/1962 | Osborn et al. ............. | 215/12.2 |
| 3,149,741 A | * | 9/1964 | Bergan .................. | 220/592.21 |
| 3,514,006 A | * | 5/1970 | Molnar .................. | 220/560.13 |
| 4,863,665 A | * | 9/1989 | Schad et al. ............. | 264/328.8 |
| 4,997,124 A | * | 3/1991 | Kitabatake et al. ......... | 220/424 |
| 5,141,695 A | * | 8/1992 | Nakamura ............... | 264/328.8 |
| 5,678,725 A | * | 10/1997 | Yamada et al. ............. | 220/422 |
| 5,706,969 A | * | 1/1998 | Yamada et al. ............. | 220/422 |
| 5,896,641 A | * | 4/1999 | Yamada et al. ............. | 29/455.1 |

* cited by examiner

Primary Examiner—Gregory M. Vidovich
Assistant Examiner—Jermie E. Cozart
(74) Attorney, Agent, or Firm—Darby & Darby

(57) ABSTRACT

The present invention relates to an insulated vessel which may be produced at low cost, has superior insulating capabilities and excellent volumetric efficiency, and which may be suitably employed in a thermos, cooler, icebox, insulated cup, thermal insulated lunch box, thermal insulated electric pot, heat retaining rice cooker, refrigerator or freezer box insulating material, or as an insulating layer in a bath tub. The insulated vessel of the present invention is characterized in the formation of an insulating layer in the space interval between the inner vessel and the outer vessel of a double walled vessel which is filled with a low thermoconductive gas consisting of at least one the gases of xenon, krypton, and argon, and in the disposition of a metallic heat radiation preventing material at the insulating layer.

7 Claims, 3 Drawing Sheets

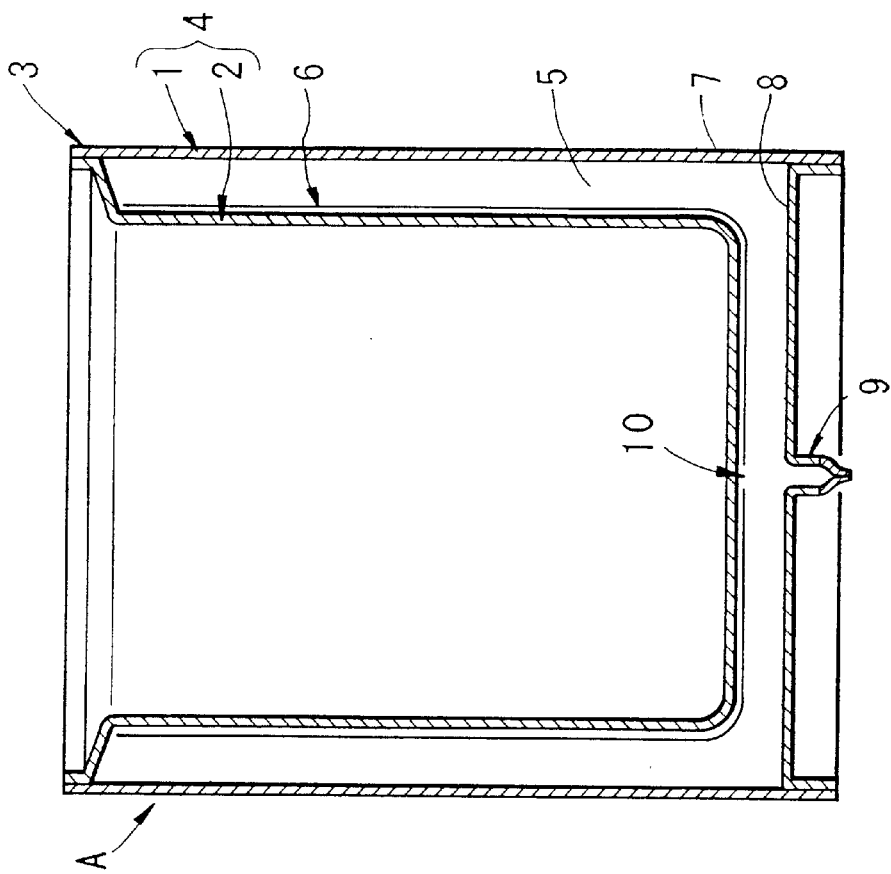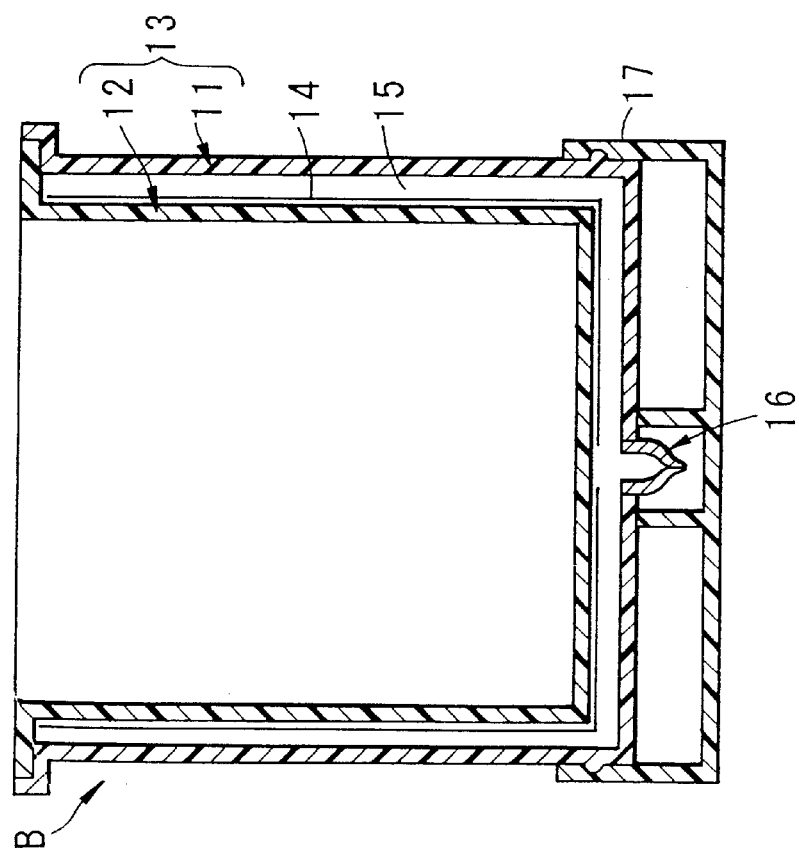

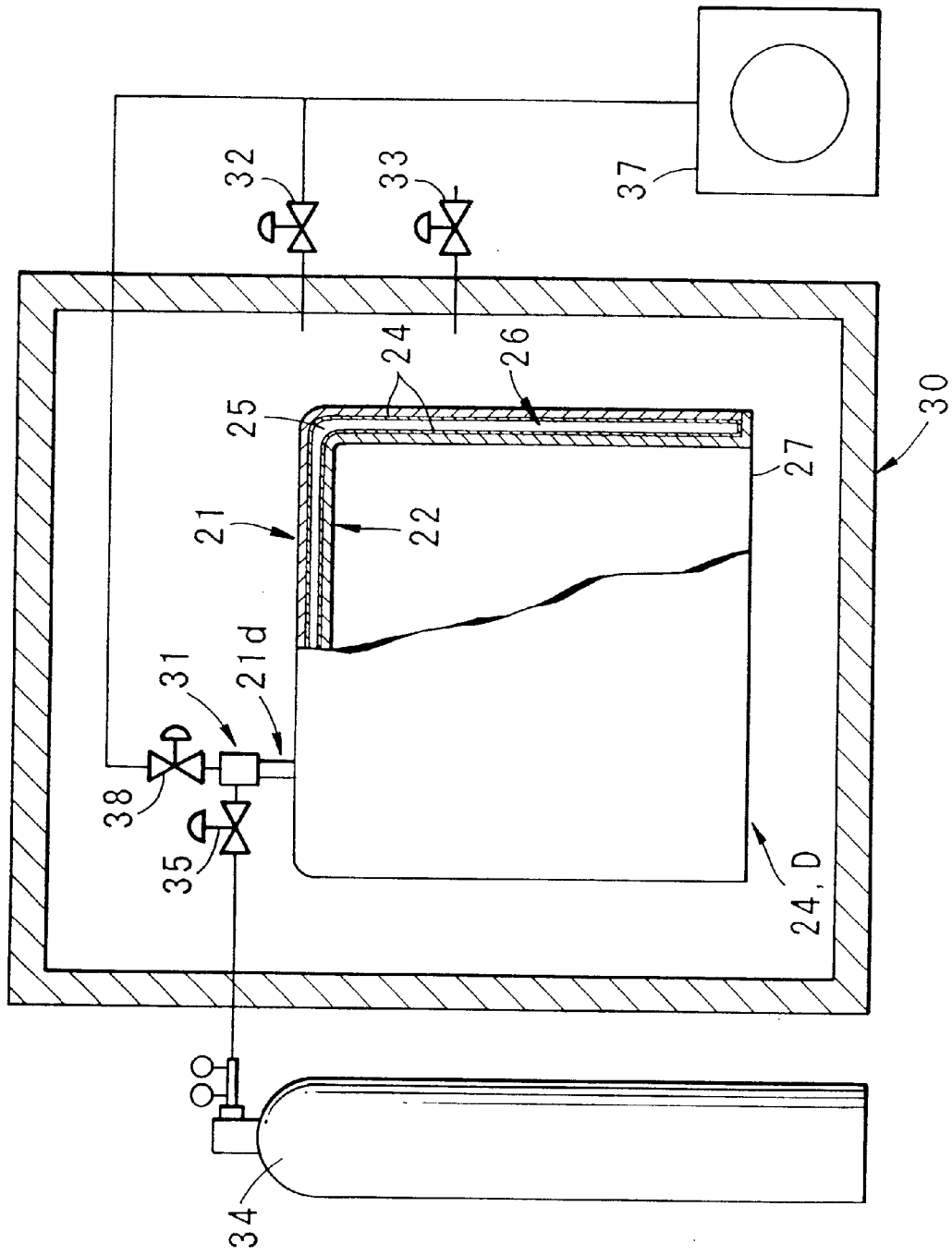

METHOD FOR PRODUCING AN INSULATED VESSEL

This is a continuation, of application Ser. No. 08/890,701, filed Jul. 11, 1997 now. U.S. Pat. No. 6,179,155 which is a continuation of application Ser. No. 08/383,759 filed Feb. 2, 1995 now abandoned. Each of these prior applications is hereby incorporated herein by reference, in its entirety.

BACKGROUND OF THE INVENTION

The present invention relates to an insulated vessel which may be produced at low cost, has superior insulating capabilities and excellent volumetric efficiency, and which may be suitably employed in a thermos, cooler, icebox, insulated cup, thermal insulated lunch box, thermal insulated electric pot, heat retaining rice cooker, refrigerator or freezer box material, or as an insulating layer in a bath tub.

Insulated vessels are conventionally available having a double walled structure wherein the space interval between the outer vessel and the inner vessel is filled with an organic foaming material such as hard urethane foam or foaming polystyrene, or a fabrication thereof, or is filled with an inorganic powder such as perlite.

Also conventionally available is a vacuum insulated vessel wherein the space between the inner vessel and the outer vessel of a double walled vessel consisting of a metallic inner vessel and a metallic outer vessel joined in an integral fashion is vacuum sealed to form a vacuum insulating layer.

However, in the former insulated vessel, because the coefficient of thermal conductivity of the insulating material itself is large compared to the case of a vacuum insulation, it is not possible to obtain a high degree of insulating capability. Further, problems also exist with respect to the production and capabilities of this vessel in that, because it is necessary to make the insulating layer thick (more than several centimeters) the vessel has a small ratio of inner volume to the outer volume. That is to say, volumetric efficiency is reduced.

Furthermore, while the latter vacuum insulated vessel has excellent insulating capabilities, an insulating layer of a small thickness, and large volumetric efficiency, the production process is complicated. Accordingly, high production costs are incurred.

SUMMARY OF THE INVENTION

The present invention was conceived in consideration of the aforementioned problems, and has as an object the provision of an insulated vessel which has excellent insulating properties, is light, and for which it is possible to achieve a high volumetric efficiency.

The insulated vessel of the present invention has a double walled structure wherein an inner vessel and an outer vessel have been joined in an integral fashion, with the space interval therebetween being filled with a low thermoconductive gas consisting of at least one of xenon, krypton and argon. Furthermore, in the present invention, a metallic heat radiation preventing material is disposed at least one of the outer surface of the inner vessel and the inner surface of the outer vessel.

The aforementioned heat radiation preventing material is selected from a metallic foil disposed in the aforementioned space interval, or a metallic film provided at at least one of the outer surface of the inner vessel or the inner surface of the outer vessel.

The space interval between the inner vessel and the outer vessel of the double walled vessel in this insulated vessel is preferably between 1 and 10 mm thick.

Furthermore, the insulating layer may be constructed as a plurality of layers by disposing in the space interval between the inner vessel and the outer vessel one or more partitioning members which partition the insulating layer in the direction of the thickness thereof. The space interval of the respective partitioned insulating layers is preferably in the range of 1 to 10 mm.

Furthermore, the filling pressure of the low thermoconductive gas which fills the space between the inner vessel and the outer vessel of the double walled vessel of the present invention is preferably 740–780 mmHg at room temperature.

The method for producing the insulated vessel of the present invention comprises the steps of:
  preparing a double walled vessel wherein an inner vessel and an outer vessel are joined in an integral fashion, an opening is provided to either the inner vessel or the outer vessel, and a metallic heat radiation preventing material is disposed between the outer surface of the inner vessel and the inner surface of the outer vessel;
  evacuating the air from the space interval between the inner vessel and the outer vessel via the opening of the double walled vessel;
  filling the space interval with a low thermoconductive gas consisting of at least one of xenon, krypton and argon; and
  sealing the opening of the double walled vessel.

The aforementioned heat radiation preventing material is selected from a metallic foil disposed in the space interval, or a metallic film provided at at least one of the outer surface of the inner vessel and the inner surface of the outer vessel. The aforementioned opening provided to the double walled vessels is selected from an evacuation hole or an evacuation tube.

In this production method, preferable as the method of production for the double walled vessel are the following methods:

a) A method wherein a cylindrical inner vessel having a bottom and a cylindrical outer vessel are attached in an integral fashion at the mouth portions thereof, a metallic heat radiation preventing material is disposed between the outer surface of the inner vessel and the inner surface of the outer vessel, and a bottom plate having said opening is joined to the open bottom of the outer vessel.

b) A method wherein a cylindrical inner vessel having a bottom and a cylindrical outer vessel, having a bottom which has said opening, are prepared, a metallic heat radiation preventing material is disposed between the outer surface of the inner vessel and the inner surface of the outer vessel, and the inner vessel and the outer vessel are joined in an integral fashion at the mouth portions thereof.

c) A method wherein a configured double walled structure is prepared with the mouth portion for a cylindrical outer vessel and a cylindrical inner vessel having a bottom being formed in an integral fashion using an integral double molding method, a metallic heat radiation preventing material is disposed to at least one of the outer surface of the inner vessel and the inner surface of the outer vessel, and a bottom plate having said opening is joined to the open bottom of the outer vessel.

It is preferable that the pressure difference between the space interval and the environment outside the double walled vessel be small or nonexistent when carrying out the step for evacuating the air in the space interval between the inner vessel and the outer vessel of the double walled vessel and the step for filling with the space with the low thermoconductive gas.

In the insulated vessel of the present invention, the insulating layer is formed by filling the space interval between the inner vessel and the outer vessel of the double walled vessel with a low thermoconductive gas consisting of at least one of xenon, krypton and argon, and disposing a metallic heat radiation preventing material in the insulating layer. As a result, the present invention has markedly improved insulating capabilities as compared to conventional insulated vessels wherein the space between the inner vessel and the outer vessel is filled with an organic or inorganic solid insulating material. Furthermore, because the present invention does not employ the technique of filling with a solid insulating material, it is possible to make the insulated vessel lighter. Moreover, as compared to conventional vacuum insulated vessels, the pressure difference between the insulating layer and the outside in the present invention is small so that, accordingly, the pressure strength demanded of the double walled vessel is also small. As a result, it becomes possible to increase the degree of freedom permitted with respect to the shape and material of the double walled vessel. Furthermore, the volumetric efficiency of the insulated vessel is improved. Accordingly, by means of the present invention it becomes possible to offer an insulated vessel which has superior insulating capabilities, is light, and has high volumetric efficiency.

Moreover, by setting the thickness of the insulating layer to be between 1 and 10 mm, convection of the filler gas is controlled, thus obtaining excellent insulating effects.

By disposing one or more partitioning members which partition the insulating layer along the direction of its width in the space interval between the inner vessel and the outer vessel a plurality of insulating layers is formed. As a result, an insulated structure identical to that in which a plurality of insulating layers are layered on top of one another is obtained, making it possible to obtain even more excellent insulating properties.

Furthermore, by setting the filling pressure of the low thermoconductive gas to be 740–780 mmHg at room temperature, the pressure difference between the insulating layer and the outside when pouring in cold or hot liquids is small and the atmosphere pressure applied to the double walled vessel is reduced. The pressure strength required of the vessel is reduced, and the vessel can be made more lightweight. Moreover, it is possible to further increase the degree of freedom permitted with respect to the design and material of the vessel.

Moreover, in the production method for the insulated vessel of the present invention, a double walled vessel wherein a metallic heat radiation preventing material is disposed at, at least one of either the outer surface of the inner vessel or the inner surface of the outer vessel is produced. The air in the space interval between the inner vessel and the outer vessel is evacuated via an evacuation hole or an evacuation tube in the double walled vessel, and this space interval is then filled with a low thermoconductive gas. The opening of the evacuation hole or the evacuation tube is sealed, obtaining an insulated vessel having excellent insulating properties. The production steps are simple and easy. Moreover, because production using a synthetic resin material which is easily formable is also possible, it is possible to reduce production costs.

Furthermore, if a metallic foil is used as the heat radiation preventing material, a lower cost production as compared to one employing the technique of plating the surfaces of the inner and outer vessels which face the insulating layer can be realized.

Moreover, by using a heat radiation preventing material consisting of metallic foil, the double walled vessel and the metallic foil are easily recyclable. Accordingly, the present invention is advantageous both from the perspective of low production cost and conservation of resources.

Moreover, by making the pressure difference between the space between the inner vessel and the outer vessel and the outside small when carrying out the steps of vacuum evacuating this space and filling it with a low thermoconductive gas such as xenon, it is possible to prevent the application of external force arising from a pressure difference on the double walled vessel. Even when employing a double walled vessel which has almost no pressure proof structure, no dents are created in the vessel, and it is possible to sufficiently evacuate the inside. As a result, the degree of freedom permitted with respect to the design and material of the vessel is increased, and the vessel can be made even more lightweight.

BRIEF DESCRIPTION OF THE DRAWINGS

FIG. 1 is a cross sectional diagram showing a first preferred embodiment of the insulated vessel of the present invention.

FIG. 2 is a cross sectional diagram showing the insulated cup of the second preferred embodiment of the insulated vessel of the present invention.

FIG. 5 is a structural diagram showing an example of the device employed in the production of the insulated vessel of the present invention.

DETAILED DESCRIPTION OF THE PREFERRED EMBODIMENTS

Embodiment 1

Figure 3:
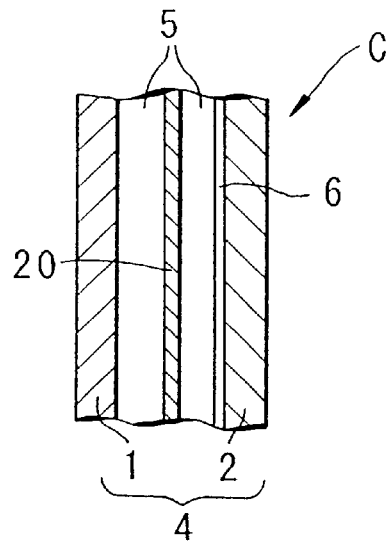
FIG. 3 is a partial cross sectional diagram showing the third preferred embodiment of the insulated vessel of the present invention.

FIG. 1 shows a first embodiment of the insulated vessel of the present invention. Insulated vessel A is formed by joining in an integral fashion the respective mouth portions 3 of an inner vessel 2 and an outer vessel 1 consisting of a metallic material such as stainless steel, glass, ceramic, or a synthetic resin material having high gas barrier capabilities; forming an insulating layer 5 by filling the space interval between the inner vessel 2 and the outer vessel 1 of the double walled vessel 4 with a low thermoconductive gas consisting of at least one of xenon, krypton, and argon; and disposing a heat radiation preventing material 6 consisting of metallic foil to at least the outer surface of the inner vessel 2 or the outer surface of the inner vessel 2 and inner surface of the outer vessel 1.

Outer vessel 1 consists of a cylindrical outer vessel side portion 7 and a bottom plate 8 which is joined in an airtight fashion to the open bottom of the outer vessel. An evacuation tube 9 is provided at the center of this bottom plate 8. The end of this evacuation tube 9 is pressure sealed and cut off.

Employable as the gas which fills the space between outer vessel 1 and inner vessel 2 is an inert gas having a coefficient of thermal conductivity κ which is smaller than that of air ($\kappa_{air}$=2.41×10$^2$ W·m$^{-1}$·K$^{-1}$ at 0°) such as xenon (κ=0.52×10$^2$ W·m$^{-1}$·K$^{-1}$ at 0°), krypton (κ=0.87×10$^2$ W·m$^{-1}$·K$^{-1}$ at 0°) or argon (κ=1.63×10$^2$ W·m$^{-1}$·K$^{-1}$ at 0°), or a mixture thereof. Xenon, krypton, and argon have low coefficients of thermal conductivity and are not problematic with respect to the environment, making them particularly suitable.

The filling pressure of the low thermoconductive gas is preferably 740–780 mmHg at room temperature. When the filling pressure is in this range, the insulating capabilities of the insulating layer 5 are good and the pressure difference between the insulating layer 5 and the outside is small. As a result, denting or swelling due to the application of external force on the double walled vessel because of a pressure difference does not occur.

The thickness of the insulating layer 5 is preferably set to be within the range of 1 to 10 mm. If the thickness is greater than 10 mm, convection of the low thermoconductive gas inside the vessel can occur easily, and the quantity of heat transferred in the direction of the width of the insulating layer 5 becomes large, impairing the insulating efficiency. When the thickness of the insulating layer is made less than 1 mm, it is difficult to form double walled vessel 4 while avoiding contact between inner vessel 2 and outer vessel 1. Accordingly, greater care and attention is required in the production process, causing an increase in production costs.

A metallic foil which is formed to match the outer shape of the inner vessel 2 is attached to the outside of inner vessel 2 to comprise heat radiation preventing material 6.

Alternatively, a metallic tape wrapped around the outer surface of inner vessel 2 may be suitably used. The heat radiation preventing material 6 is disposed to prevent heat transition caused by radiation. A variety of metallic foils such as aluminum, copper, or silver which are highly reflective of heat rays may be used. Copper foil, however, is preferable. This heat radiation preventing material 6 should be affixed to the surface of one vessel using an adhesive agent or by brazing in a manner so as not to come in contact with the other vessel. A ventilation hole 10 is provided at some position in heat radiation preventing material 6.

In producing insulated vessel A, a cylindrical outer vessel side portion 7 and a cylindrical inner vessel 2 with a bottom are first formed using a metallic material such as stainless steel, glass, ceramic or a synthetic resin material having high gas barrier capabilities. It is preferable at this stage to also form a bottom plate 8 with an evacuation tube made from the same material as selected for outer side portion 7 and inner vessel 2. Next, the metallic foil is attached to the outer surface of inner vessel 2 by coating the surface thereof with an adhesive agent, or, alternatively, a metallic tape may be wrapped around the outer surface of the inner vessel 2. At the same time, the mouth portion 3 of inner vessel 2 and one edge of outer vessel side portion 7 are joined in an integral fashion. The method of connection may be optimally selected from the methods of welding, soldering, adhesion or the like in response to the material of the vessel.

Next, bottom plate 8 with the evacuation tube is joined to the open bottom of outer vessel side portion 7 in an airtight fashion. Heat radiation preventive material 6 is affixed to the outer surface of inner vessel 2, and inner vessel 2 and outer vessel 1 are joined in an integral fashion, thus forming the double walled vessel 4.

Next, the evacuation tube 9 of the double walled vessel 4 is attached to the vacuum evacuator/gas supply means which is provided with a vacuum pump and a supply source for a low thermoconductive gas such as xenon or the like. The space interval between inner and outer vessels 1 and 2 is first vacuum evacuated, then filled with a low thermoconductive gas consisting of at least one of xenon, krypton, or argon. Evacuation tube 9 is pressure sealed. As a result, an insulating layer 5 is formed between inner and outer vessels 1 and 2, obtaining the insulated vessel A shown in FIG. 1.

In response to the applications intended for the thus-obtained vessel A, vessel A may be offered as a finished product having attached thereto a bottom member, shoulder portions having handles or grips, or with an insulated opening and closing lid.

The steps for vacuum evacuating the space between inner and outer vessels 1 and 2 and filling it with a gas such as xenon is preferably carried out so that the pressure difference between the space interval and the environment outside the vessel is minimized as much as possible. In other words, by making the pressure difference between the space interval and the outside small and then carrying out vacuum evacuation and filling, it is possible to prevent the application of external force on double walled vessel 4 due to a pressure difference. Even when employing a double walled vessel which does not have a pressure proof structure, no dents are generated in the vessel, and it is possible to vacuum evacuate the inside. When attaching an evacuation tube 9 to a vacuum evacuator/gas supply means as above, placing the double walled vessel 4 in a vacuum chamber and vacuum evacuating the space interval between inner and outer vessels 1 and 2 via evacuation tube 9 in order to carry out vacuum evacuation and filling with the gas after minimizing the pressure difference between the space interval between the inner and outer vessels 1 and 2 and the outside environment, the pressure in the vacuum chamber is lowered, the pressure difference between the space interval and the vacuum chamber is minimized, and the space interval is filled with a low thermoconductive gas such as xenon via evacuation tube 9. Air or another gas is introduced into the chamber so that a pressure difference is not generated between the space interval and the inside of the chamber as the space interval is filled with the low thermoconductive gas. The evacuation tube is then pressure sealed.

In place of evacuation tube 9, an evacuation hole in the form of a small opening or small groove may be formed in double walled vessel 4. Brazing material and a sealing plate are placed in proximity to the hole and heated to melt the brazing material and seal the evacuation hole with the sealing plate. Alternatively, an insulated vessel of the type where the brazing material is melted, flowing into and sealing the evacuation hole, may be produced. In this case, after disposing the brazing material and the sealing plate in the proximity of the evacuation hole, the double walled vessel 4 is placed in a vacuum heating furnace. By vacuum evacuating the furnace, the space between inner and outer vessels 1 and 2 is vacuum evacuated via the evacuation hole. A low thermoconductive gas such as xenon or the like is introduced into the furnace, filling the space between inner and outer vessels 1 and 2 with the gas via the evacuation hole. The evacuation hole is then sealed by heating to melt the brazing material.

In this insulated vessel A, an insulating layer 5 is formed by introducing a low thermoconductive gas consisting of at least one of xenon, krypton, and argon in the space interval between the inner vessel 2 and the outer vessel 1 of the double walled vessel 4. As a result, it is possible to greatly improve the insulating capabilities in the present invention as compared to conventional insulated vessels wherein the space between the inner and outer vessels 1 and 2 is filled with an organic or inorganic solid insulating material.

Furthermore, because no solid insulating material is used to fill the space, the insulated vessel of the present invention is lighter in weight. Moreover, the pressure difference between the insulating layer 5 and the outside is small as compared to conventional vacuum evacuated vessels, thus only a small degree of pressure proof strength is required of the double walled vessel 4. The present invention permits greater freedom with respect to the shape and material of the vessel (the double walled vessel may, for example, be square shaped) and provides for an improved volumetric efficiency of the insulated vessel.

Furthermore, because a heat radiation preventing material 6 consisting of a metallic foil is disposed at at least the outer surface of the inner vessel 2, production costs are lower than in the case where the technique of plating the surfaces of inner and outer vessels 1 and 2 which face the insulating layer 5. Moreover, by employing a heat radiation preventing material 6 consisting of a metallic foil, recycling of the metallic foil and the double walled vessel 4 is made easy. Thus, the present invention is particularly advantageous from the prospective of reduced production costs and conservation of resources.

Furthermore, in this insulated vessel A, a double walled vessel 4 wherein a heat radiation preventing material 6 consisting of a metallic foil is attached to at least the outer surface of the inner vessel. The air in the space interval between the inner vessel 2 and the outer vessel 1 is evacuated via evacuation tube 9 of the double walled vessel 4. Next, the space interval is filled with a low thermoconductive gas such as xenon or the like, and the evacuation tube 9 is sealed. As a result, it is possible to produce an insulated vessel having excellent insulating capabilities, and the production steps are simple and easy. Accordingly, production costs can be reduced.

It is noted that, while in the preceding embodiment an evacuation tube 9 was provided to the outer vessel lower plate 8 of the double walled vessel 4 and was pressure sealed and cut off following filling of the space with the gas, the position of evacuation tube 9 is not limited thereto. Rather, the evacuation tube 9 may have a structure wherein it is covered by the bottom member or a handle attached to the insulated vessel A. Moreover, in place of evacuation tube 9, double walled vessel 4 may be provided with an evacuation hole consisting of a small opening or small groove. A sealing plate is joined through brazing by disposing brazing material or the like around the proximity of the evacuation hole. Alternatively, a concavity may be formed to double walled vessel 4 and an evacuation hole may be provided in the concavity. This evacuation hole is then sealed by melting brazing material disposed within the concavity, causing it to flow into the evacuation hole.

Embodiment 2

FIG. 2 shows the insulated cup of the second embodiment of the insulated vessel of the present invention. This insulated cup B is formed by joining the respective mouth portions of cylindrical inner vessel 12 and outer vessel 11 which have bottoms and consist of a synthetic resin in an integral fashion to form double walled vessel 13. A heat radiation preventing material 14 consisting of copper foil is affixed to the outer surface of inner vessel 12 with an adhesive agent, and the low thermoconductive gases consisting of at least one of xenon, krypton, and argon are used to fill the space interval between the inner and outer vessels 11 and 12, thereby forming insulating layer 15.

An evacuation tube 16, the end portion of which has been sealed, is provided to the bottom plate of outer vessel 11. A bottom cover 17 is forcibly engaged to the bottom portion of outer vessel 11 so as to cover evacuation tube 16. A synthetic resin which is heat resistant up to temperatures above 100° C. and has good formability can be employed as the material of outer vessel 11, inner vessel 12 and bottom cover 17. Polypropylene, ABS, polycarbonate or the like are preferable as this material.

As in the previous embodiment, the filling pressure of the low thermoconductive gas in insulating layer 15 is preferably 740–780 mmHg at room temperature.

Furthermore, the thickness of the insulating layer 15 is preferably set to be in the range of 1 to 10 mm.

An explanation of the structure of insulated cup B will now be made. First, a resin material such as polypropylene is formed using a suitable forming means such as injection molding to produce a cylindrical inner vessel 12 having a bottom and a flange at the top end thereof, and a cylindrical outer vessel 11 having a bottom and provided at the upper end thereof with a stepped portion which interfits with the flange. A metallic tube which will form the evacuation tube is joined to the bottom portion of outer vessel 11 using fusion joining or through use of an epoxy adhesive agent.

Next, the epoxy adhesive agent is coated on various places on the outer surface of the inner vessel 12, and heat radiation preventing material 14 is formed by wrapping a tape material consisting of copper foil thereover. A small hole for circulation purposes is formed in the heat radiation preventing material 14.

Next, inner vessel 12 is placed inside outer vessel 11. The flange of inner vessel 12 sits into the stepped portion of outer vessel 11. The mouth portions of the inner and outer vessels 11 and 12 are joined using heat fusion or an adhesive agent. Inner and outer vessels 11 and 12 are joined in an integral fashion at the mouth portions thereof, forming double walled vessel 13. More preferably, the connection step may be carried out using friction welding or spin welding.

Next, the metallic tube (evacuation tube 16) of the double walled vessel 13 is attached to the vacuum evacuator/gas supplier which is provided with a vacuum pump and a supply source for a low thermoconductive gas such as xenon. The space interval between inner and outer vessels 11 and 12 is vacuum evacuated, and filled at a set pressure with the low thermoconductive gas consisting of at least one of xenon, krypton, and argon. Then the metallic tube (evacuation tube 16) is pressure sealed. In this manner, insulating layer 15 is formed by filling the space between inner and outer vessels 11 and 12 with a low thermoconductive gas.

Next, bottom cover 17 is forcibly engaged to the bottom portion of outer vessel 11 to obtain the insulated cup B as shown in FIG. 2. The means by which bottom cover 17 is forcibly engaged is not particularly limited. As is shown in FIG. 2, for example, projections may be provided near the lower portion of the outer surface of outer vessel 11, and concave grooves may be formed in the inner surface of bottom cover 17. Bottom cover 17 fits into the lower portion of outer vessel 11, interfitting the projections and the concave grooves. In addition to this type of structure, also permissible is a structure where bottom cover 17 is attached using a screw engagement.

As necessary, insulated cup B may also be formed having attached thereto a shoulder member provided with a grip.

Effects almost identical to those described for insulated vessel A in the preceding first embodiment are obtained with insulated cup B. In addition, because double walled vessel 13 is formed using a cylindrical outer vessel 11 having a bottom to which is joined an evacuation tube 16, and fusing this outer vessel 11 to an inner vessel where the mouth portions thereof join, it is possible to omit the stop of joining lower plate 8 to the bottom end of outer vessel side portion 7. Accordingly production efficiency can be improved.

It is noted here that other optimal production methods for producing insulated cup B may be offered. For example, a double walled structure wherein only the bottom portion of outer vessel 11 is open may be formed by carrying out an integral double molding method using a convenient molding means such as injection molding of a resin material like polypropylene. In the same manner as described in the preceding production method, copper foil tape or the like is then used to form a heat radiation preventing material 14 about the outer surface of the inner vessel or the inner surface of the outer vessel. Next, the bottom plate to which is attached a metallic tube which will function as evacuation tube 16 is joined in an integral fashion to the open bottom of the double walled structure by means of a joining method such as friction welding or spin welding. Next, as in the production method described above, the metallic tube is attached to the vacuum evacuator/gas supply means, and vacuum evacuation of the space between the inner and outer vessels of the double walled vessel is performed. The space is then filled with a low thermoconductive gas such as xenon or the like, and the tube is then pressure sealed. The insulated cup is then produced by forcibly engaging bottom cover 17.

In this production method, because the double walled structure is formed using an integral double molding method, the step for joining the mouth portions of the inner and outer vessels is omitted. Further, by forming a double walled vessel by means of integral double molding in this way, irregularities in the mouth portion of the double walled vessel can be eliminated. Accordingly, an insulated cup which has a rim which provides a smooth sensation on the lips when drinking is obtained.

Embodiment 3

FIG. 3 shows a third embodiment of the insulated vessel of the present invention. This insulated vessel C was formed by providing composition elements almost identical to those of insulated vessel A of the above described embodiment 1, and is characterized by the disposition between the walls of outer vessel 1 and inner vessel 2 of a partitioning member 20 for partitioning the insulating layer 5 in the direction of the thickness thereof.

A small hole for gas circulation is provided to partitioning member 20, preferably when partitioning member 20 is being formed. In addition, partitioning member 20 is disposed between inner vessel 2 and outer vessel 1 in a manner so that the permeation of the xenon or other filler gas is prevented. The material of partitioning member 20 is not particularly limited but may be made from metal or a synthetic resin. It is preferable, however, to reduce radiation loss for the vessel by using, in conjunction with heat radiation preventing material 6, a metallic material which has a high rate of refraction of radiant heat. Further, by providing a partitioning member 20 which has radiation preventive effects such as these, it is possible to omit the use of a heat radiation preventing material 6.

In addition, partitioning member 20 may be provided so as to form two layers or more. Furthermore, suitable as the method of disposition of the partitioning member 20 is a method wherein a partitioning member 20 shaped to fit the outer surface of the inner vessel 2 but slightly larger than the inner vessel 2 is formed using a metallic foil material or the like. This is placed on top of inner vessel 2 to which is affixed heat radiation preventing material 6, the lower surface of the flange of inner vessel 2 joining with the upper end of partitioning member 20. Next, outer vessel 1 is placed on top of the assembly of inner vessel 2 and partitioning member 20, and inner vessel 2 and outer vessel 1 are joined in an integral fashion at their respective mouth portions. In this case, it is necessary to ensure that partitioning member 20 does not touch inner vessel 2 or outer vessel 1.

The insulated vessel C obtained according to this embodiment provides nearly the same effects as those obtained in the preceding embodiment 1. In addition, by designing insulating layer 5 with the provision of a partitioning member 20 which partitions the layer in the direction of the width thereof, the transition of the filler gas which fills the space between inner vessel 2 and outer vessel 1 in the direction of the width thereof is prevented. Accordingly, in essence the insulating structure obtained is one wherein a plurality of insulating layers are placed on top of one another, making it possible to obtain even better insulating capabilities.

Embodiment 4

Figure 4:
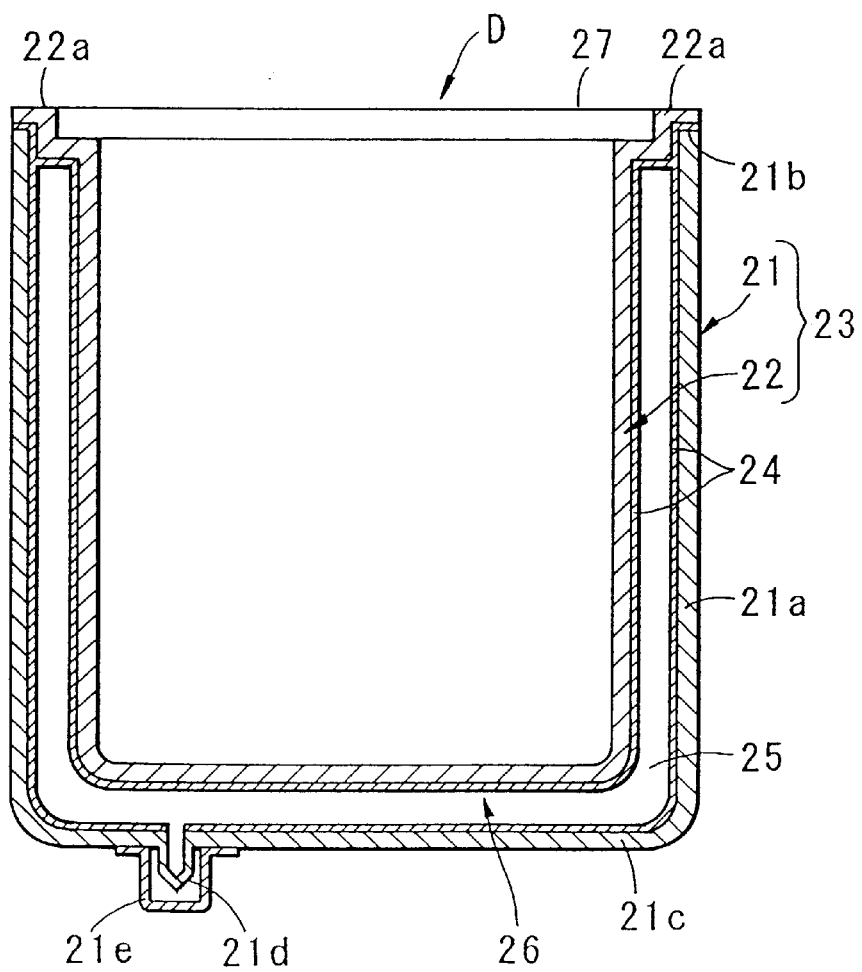
FIG. 4 is a cross sectional diagram showing a fourth preferred embodiment of the insulated vessel of the present invention.

FIG. 4 shows a fourth embodiment of the insulated vessel of the present invention. This insulating vessel D is provided with an inner vessel 22, an outer vessel 21 disposed about the circumference of inner vessel 22, heat radiation preventing materials 24,24 consisting of metallic film formed respectively to opposing surfaces of inner vessel 22 and outer vessel 21, and a low thermoconductive gas which fills the space interval 26 between opposing heat radiation preventing materials 24,24. Inner vessel 22 and outer vessel 21 are joined in an integral fashion at the peripheries thereof to form a double walled vessel 23. Insulating layer 25 is formed by filling the space interval 26 with a low thermoconductive gas.

Inner vessel 22 is formed of a synthetic resin such as ABS resin or the like. Inner vessel 22 is formed in a box shape having a bottom wherein an open portion 27 is formed at the top thereof as shown in FIG. 4. Flange 22a which lies along the periphery of opening 27 of inner vessel 22 is formed projecting outward. The lower surface of flange 22a is joined in an integral fashion to stepped portion 21b which is formed at the top end of side wall plate 21a of outer vessel 21 by thermofusion, or the use of a synthetic resin adhesive such as soldering, epoxy resin or the like.

Outer vessel 21 is formed of a synthetic resin such as ABS resin or the like. It is provided with a side wall plate 21a which is disposed along the outer surface of inner vessel 22 in opposition thereto, a bottom plate 21c which is formed in an integral fashion to side wall plate 21a, an evacuation tube 21d which is formed to bottom plate 21c projecting outward and functions for filling space interval 26 with a low thermoconductive gas, and a protector 21e which protects evacuation tube 21d from external force.

Heat radiation preventive materials 24,24 consisting of metallic film which prevents heat radiation as well as the permeation of gas are respectively formed to the outer surface of inner vessel 22 and the inner surface of outer vessel 21. Heat radiation preventive materials 24,24 are formed by means of plating, deposition or the like. A space interval 26 of 1 to 10 mm in width is formed between these opposing radiation preventive members 24,24 to be filled with a low thermoconductive gas. The low thermoconductive gas which fills this space interval 26 is prevented from permeating to the outside by surrounding space interval 26 with heat radiation preventing materials 24,24.

At least one of xenon, krypton, and argon may be used as the low thermoconductive gas.

Next, an explanation will be made of the production method for this insulated vessel D. First, heat radiation preventing material 24 is formed at the inner surface of outer vessel 21 and to the outer surface of inner vessel 22 which consist of a synthetic resin or the like using a vacuum deposition method, plating (chemical plating, electroplating) or the like. Then, flange 22a of inner vessel 22 is joined to stepped portion 21b of outer vessel 21 by means of soldering, an adhesive agent, thermofusion or the like, to form inner vessel 22 and outer vessel 21 into a unitary structure. As a result, an space interval 26 of 1 to 10 mm in width is formed between inner vessel 22 and outer vessel 21.

Next, the double walled vessel 23 is placed inside an airtight vessel 30 shown in FIG. 5. Airtight vessel 30 is provided with gas introduction portion 31 for introducing low thermoconductive gas into space interval 26 of the double walled vessel 23, a vacuum evacuation valve 32 for evacuating the air inside airtight vessel 30, and an atmosphere introduction valve 33 for introducing the surrounding atmosphere into airtight vessel 30. Gas introduction portion 31 is provided to the end of evacuation tube 21d of the double walled vessel 23. One end of gas introduction portion 31 is connected to a chemical cylinder 34 which fills the space interval 26 with a low thermoconductive gas such as xenon via filling valve 35. The other end thereof is connected to a vacuum pump 37 via an evacuation valve 38. Chemical cylinder 34 and vacuum pump 37 are provided outside airtight vessel 30.

Double walled vessel 23 is placed inside airtight vessel 30 and evacuation tube 21d of outer vessel 21 is connected to gas introduction portion 31. Then airtight vessel 30 is closed tightly, evacuation valve 38 and vacuum evacuation valve 32 are opened, and vacuum pump 37 is operated. The air inside space interval 26 of the double walled vessel 23 and the air inside airtight vessel 30 is evacuated. The difference between the pressure inside airtight vessel 30 and the pressure inside space interval 26 of double walled vessel 23 is made as small as possible. It is preferable to reduce the pressure so that excessive force is not applied to double walled vessel 23. Then, once the pressure of airtight vessel 30 has reached one-tenth of ambient pressure, vacuum evacuation valve 32 is closed, and the vacuum evacuation of airtight vessel 30 is complete. The vacuum evacuation of space interval 26 of double walled vessel 23 continues until the pressure within space interval 26 reaches 10 mmHg. Then, evacuation valve 38 is closed, and the vacuum evacuation of double walled vessel 23 is complete.

Next, filling valve 35 is opened and a low thermoconductive gas such as xenon from chemical cylinder 34 fills space interval 26 of double walled vessel 23. At this point, the atmosphere valve 33 is opened so that the difference between the pressure in airtight vessel 30 and the pressure in space interval 26 is made small so as not to apply excessive force to double walled vessel 23. As the atmosphere is introduced into airtight vessel 30, space interval 26 is filled with a low thermoconductive gas. After opening airtight vessel 30 to ambient pressure, evacuation tube 21d of double walled vessel 23 is thermofused to seal insulating layer 25, thus forming insulated vessel D. Then, insulated vessel D is removed from airtight vessel 30 and, as shown in FIG. 4, protector 21e is attached to evacuation tube 21d. By means of the above steps, the coefficient of thermal conductivity in the insulating layer 25 is small, and an insulated vessel D filled with an inert gas is obtained.

It is noted here that the preceding embodiments are not intended in any way to limit the present invention but rather a variety of variations thereon are possible. For example, the shape of the insulated vessel may vary according to the intended application and may be, for example, cylindrical, a squared-off cylindrical shape, or hemispherical. Further, the present invention may be designed so that an insulated lid is attached in an opening and closing fashion to the opening of the insulated vessel. Moreover, the insulated vessel of the present invention may be used in combination with another insulated structure such as, for example, an insulated structure filled with a solid insulating material or a vacuum insulated structure.

What is claimed is:

1. A method for producing an insulated vessel, the method comprising the steps of:

preparing a double walled vessel wherein an inner vessel and an outer vessel each made of a resin material are joined in an integral fashion with a space therebetween, an opening being provided in said double walled vessel, and a metallic heat radiation preventing material is disposed between an outer surface of said inner vessel and an inner surface of said outer vessel;

evacuating the air from said space between said inner vessel and said outer vessel via said opening provided in said double walled vessel;

filling said space with a low thermoconductive gas comprising at least one of xenon, krypton, and argon; and sealing said opening of said double walled vessel.

2. A method for producing an insulated vessel according to claim 1, wherein said metallic heat radiation preventing material is a metallic foil disposed in said space.

3. A method for producing an insulated vessel according to claim 1, wherein the step of preparing the double walled vessel further comprises the steps of:

preparing a cylindrical inner vessel with a bottom and a cylindrical outer vessel with a bottom having said opening; and fixing a metallic heat radiation preventing material to at least one of the outer surface of said inner vessel and the inner surface of said outer vessel; and joining in an integral fashion a mouth portion of each of said inner vessel and said outer vessel.

4. A method for producing an insulated vessel according to claim 1, wherein the step of preparing the double walled vessel further comprises the steps of:

forming a configured double walled structure wherein a cylindrical inner vessel with a bottom and a cylindrical outer vessel form an integral structure joined at a mouth portion thereof by means of an integral double molding;

fixing a metallic heat radiation preventing material to at least one of the outer surface of said inner vessel and the inner surface of said outer vessel; and joining a bottom plate having said opening to an open bottom of said outer vessel.

5. A method for producing an insulated vessel according to claim 1, wherein the step of evacuating the air from said space between said inner vessel and said outer vessel of said double walled vessel and the step of filling said space with said low thermoconductive gas are carried out while minimizing the pressure difference between said space and the environment outside the double walled vessel.

6. A method for producing an insulated vessel according to claim 1, wherein the opening provided in the double walled vessel is an evacuation hole.

7. A method for producing an insulated vessel according to claim 1, wherein the opening provided in the double walled vessel is an evacuation tube.

* * * * *